L. D. LAW.
Cotton-Planter.
No. 18,913. Patented Dec. 22, 1857.
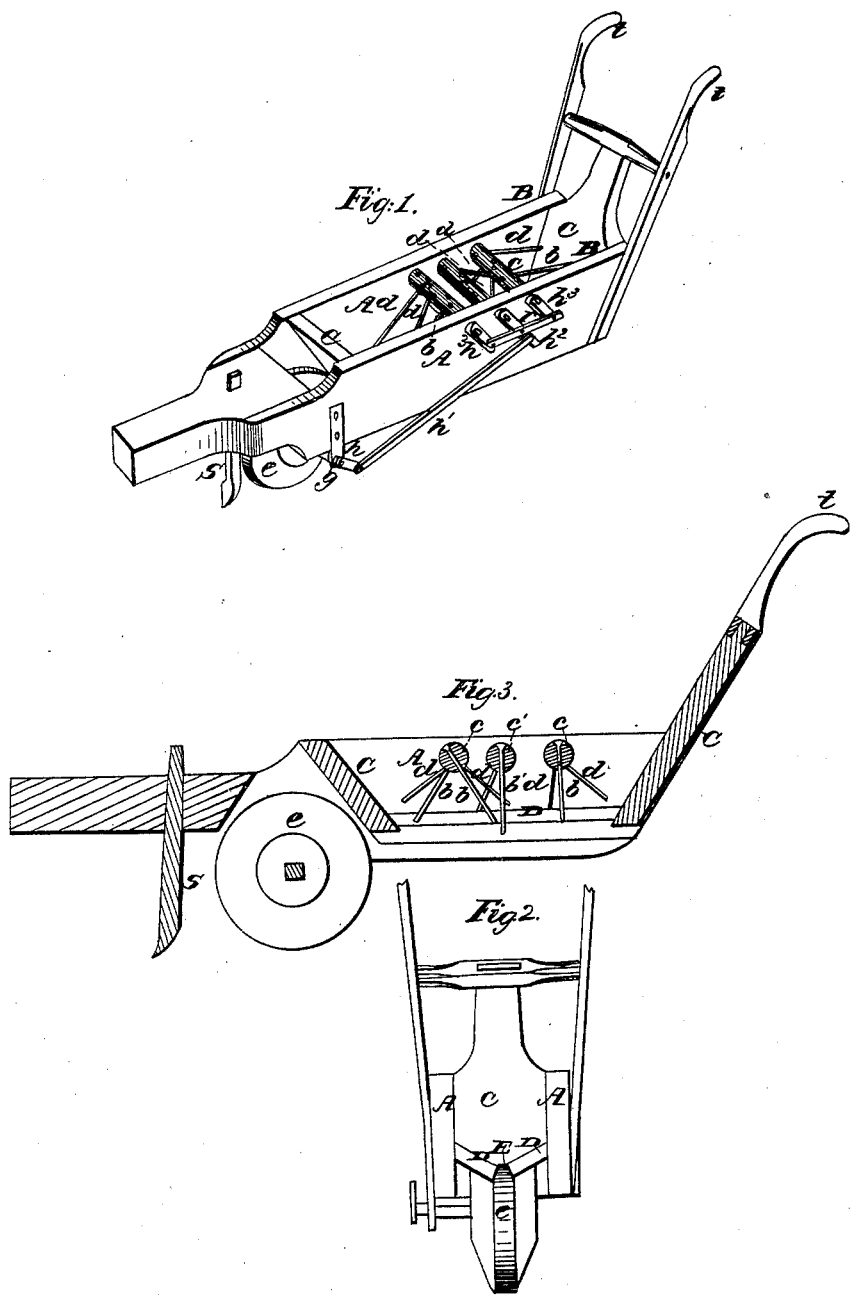

UNITED STATES PATENT OFFICE.

LORENZO D. LAW, OF HENDERSON, GEORGIA.

IMPROVEMENT IN COTTON-SEED PLANTERS.

Specification forming part of Letters Patent No. 18,913, dated December 22, 1857.

*To all whom it may concern:*

Be it known that I, LORENZO D. LAW, of Henderson P. O., in the county of Houston and State of Georgia, have invented an Improvement in Machines for Planting Cotton-Seed; and I do hereby declare that the following is a full, clear, and exact description of the principle or character which distinguishes it from all other things before known, and of the usual manner of making, modifying, and using the same, reference being had to the annexed drawings, of which—

Figure 1 represents a perspective view of the machine; Fig. 2, an end view from the rear of the machine, and Fig. 3 a longitudinal section from front to rear of the machine.

My invention is an improvement in machines for planting cotton-seeds.

From the great bulk and lightness of cotton-seed it is necessary that the receptacle for the seed should be large, and to this end I employ a long trough or hopper, A, the sides B B of which are straight, while the ends C C incline inward. The bottom of this hopper A is made with two parts, D D, inclining downward from the sides B B, leaving a short space or opening, E, extending from end to end of the hopper and flaring outward. This opening is made the place of discharge for the seed, and the flare insures the easy flow and prevents the choking up of this slot by the cotton-seed balls. The cotton is discharged through the whole length of this longitudinal slot in the following manner: The cotton-seed is placed in the oblong hopper A and fed through the slot E by means of radiating arms $b\ b\ b\ b\ b$ from the axles $c\ c'\ c$, which have their bearings in the sides B B of the hopper, and are operated as hereinafter described. The center arms, $b\ b$, &c., of these axles extend down a short distance through the slot E, sufficiently to free the seed and keep the slot clear, and these I denominate "feeders," each outer axle having two of these feeders, while the inner axle, $C'$, has only one. The arms $d\ d$ on each side of these center arms for feeding are for the purpose of agitating and stirring up the seed to the slot for the feeders to discharge.

Motion is communicated to the axles $c\ c'\ c$ by means of a beveled wheel, $e$, placed under the hopper and immediately in front of the slot E, turning loosely in bearings $g\ g$, and carrying on one end of its axle a crank-arm, $h$, to which is attached a pitman-rod, $h'$, which extends to the end of the center arm, $h''$, of the axle $c'$. The other two arms, $h'''\ h'''$, are connected to this arm by a rod, $r$, so that the turning of the wheel will communicate motion to the set of axles and agitators.

In front of the wheel $e$ is placed a colter, $s$, for opening and preparing the ground, ready to receive the seed when deposited. The front of the machine is supported by the wheel $e$, and the rear end by the driver, with the handles $t\ t$.

This machine is extremely simple and cheap and very efficient in its operation.

What I claim as my invention and improvement in cotton-seed planters is—

The employment of the vibrating agitators $c\ c'\ c$, each having its radiating arms arranged with respect to each other as set forth, in combination with the longitudinal slot E, at right angles to the axis of the radiators, all as set forth.

LORENZO D. LAW.

Witnesses:
S. F. BROWN,
THOMAS S. COBB.